UNITED STATES PATENT OFFICE.

NATALE FORNI, OF SANTA ROSA, CALIFORNIA.

WATERPROOF COMPOSITION.

1,075,097.
No Drawing.

Specification of Letters Patent.  Patented Oct. 7, 1913.

Application filed November 18, 1911.  Serial No. 661,146.

*To all whom it may concern:*

Be it known that I, NATALE FORNI, a citizen of the United States, residing at Santa Rosa, in the county of Sonoma and State of California, have invented an Improved Waterproof Composition, which is hereinafter described.

The primary object of the invention is to produce a water-proof mixture of about the consistency of milk which is adapted and intended to be mixed with cement and sharp clean sand in proper proportions and will form a product absolutely impervious to water.

In carrying out the invention and producing the mixture, I mix burnt stone lime and crude linseed oil in the proportions of one hundred pounds of the former to seventy pounds of the latter, and sufficient water to slake the lime together with twenty-five pounds of sulfur. The oil is added to the lime very slowly and carefully during the slaking of the lime, so as not to interrupt this chemical operation. The mixture thus produced is kept in suitable receptacles ready for use by mixing it with cement and sharp sand, by which means an entirely waterproof product is formed.

What I claim is:—

The improved waterproof composition, consisting of burnt lime one hundred parts, crude linseed oil seventy parts, and water in due proportion to effect the slaking of the lime together with sulfur twenty-five parts, as described.

NATALE FORNI.

Witnesses:
PIETRO SPINELLI,
MORRIS LEVY.

Copies of this patent may be obtained for five cents each, by addressing the "Commissioner of Patents, Washington, D. C."